United States Patent [19]

Penhasi

[11] Patent Number: 4,798,579
[45] Date of Patent: Jan. 17, 1989

[54] ROTOR FOR CENTRIFUGE

[75] Inventor: Harry A. Penhasi, Cupertino, Calif.

[73] Assignee: Beckman Instruments, Inc., Fullerton, Calif.

[21] Appl. No.: 115,217

[22] Filed: Oct. 30, 1987

[51] Int. Cl.[4] .................. B04B 5/02; B04B 9/00; B04B 11/00

[52] U.S. Cl. .................. 494/18; 494/16; 494/41; 494/56

[58] Field of Search .................. 494/10, 17, 18, 38, 494/16, 41, 43, 81, 27, 21, 37, 45, 84, 56, 72

[56] References Cited

U.S. PATENT DOCUMENTS

| | | | |
|---|---|---|---|
| 2,616,619 | 11/1952 | MacLeod | 494/17 |
| 4,098,456 | 7/1978 | Bayham | 494/17 |
| 4,350,283 | 9/1982 | Leonian | 494/10 |
| 4,670,002 | 6/1987 | Koreeda et al. | 494/10 |

*Primary Examiner*—Timothy F. Simone
*Attorney, Agent, or Firm*—William H. May; Paul R. Harder

[57] ABSTRACT

The present invention provides an improved rotor for a centrifuge that operates by centrifugal elutriation. The rotor consists of a chamber assembly, a disk assembly, and a quick release mechanism. The chamber assembly is relatively light and it includes one or two separation chambers, tubing and a rotating seal. The disk assembly consists of the relatively heavy support structure. The two piece construction facilitates handling the parts of the rotor that generally need to be autoclaved. The chamber assembly has a novel structure that allows the rotor to easily be configured for operation with one or two chambers. The disk assembly has a unique strain relief that prevents structural cracking. The quick release mechanism is held in the latched position by centrifugal force during operation of the rotor.

10 Claims, 6 Drawing Sheets

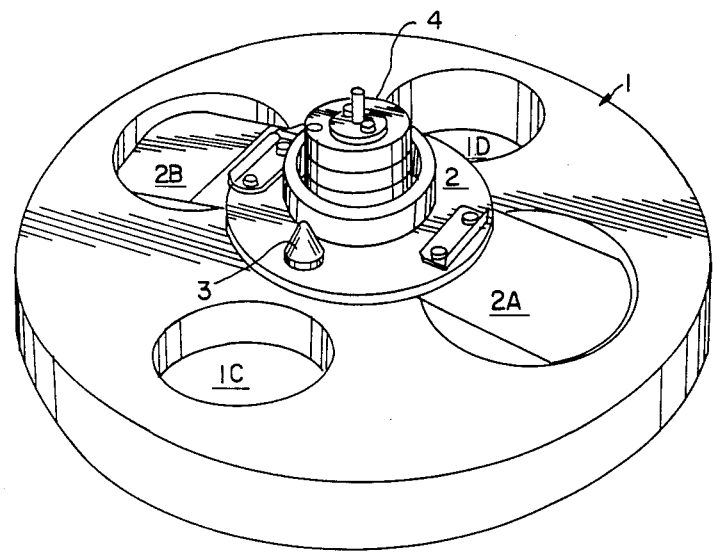
FIG. 1
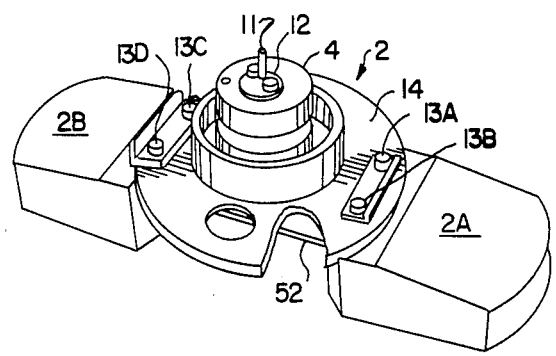
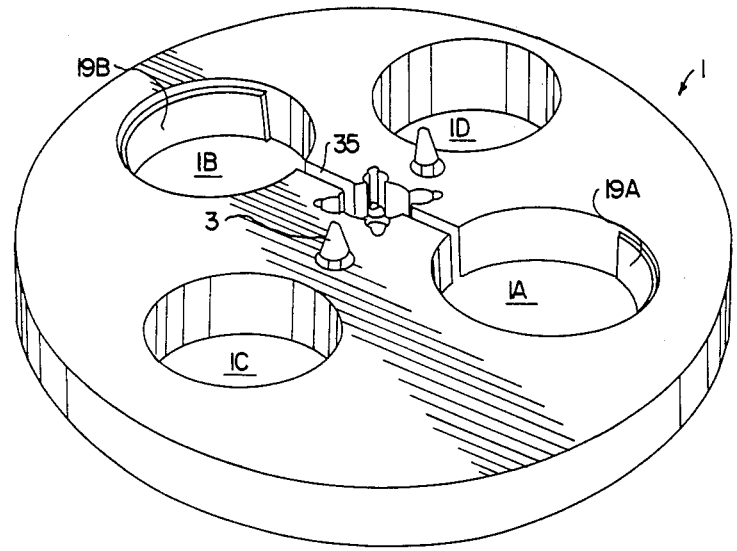
FIG. 2

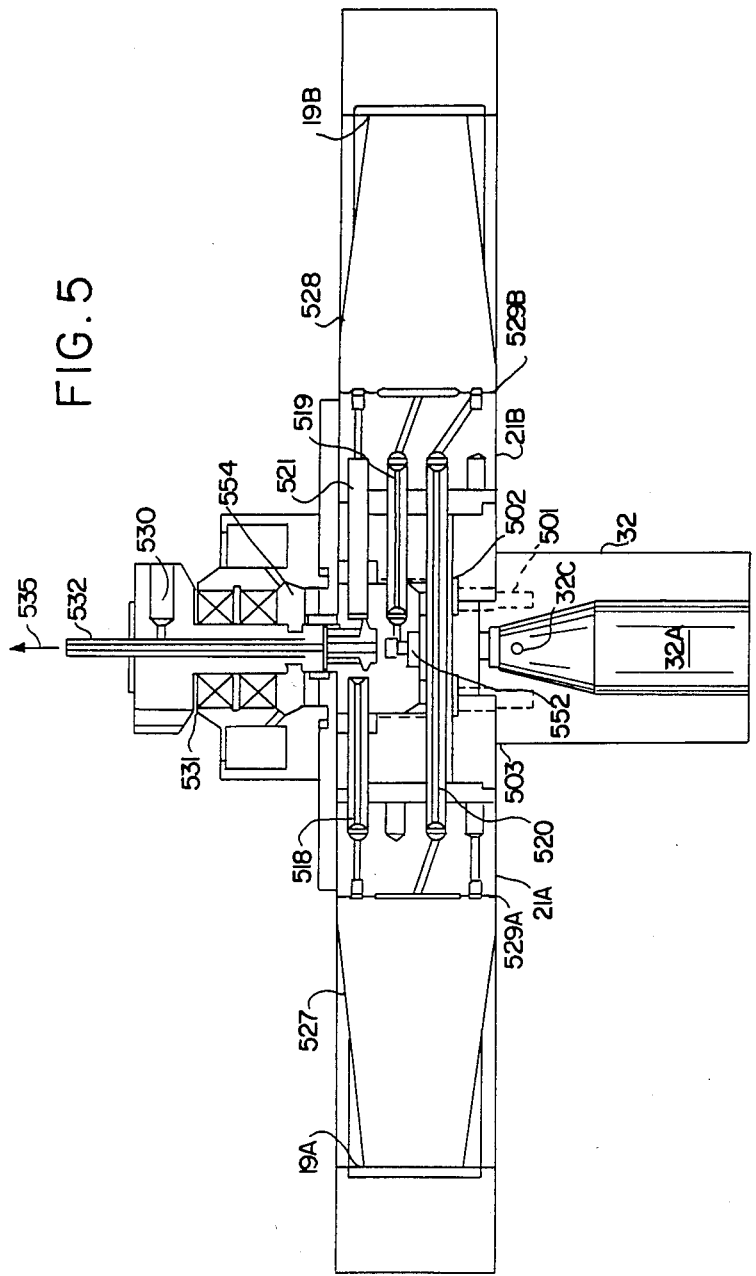

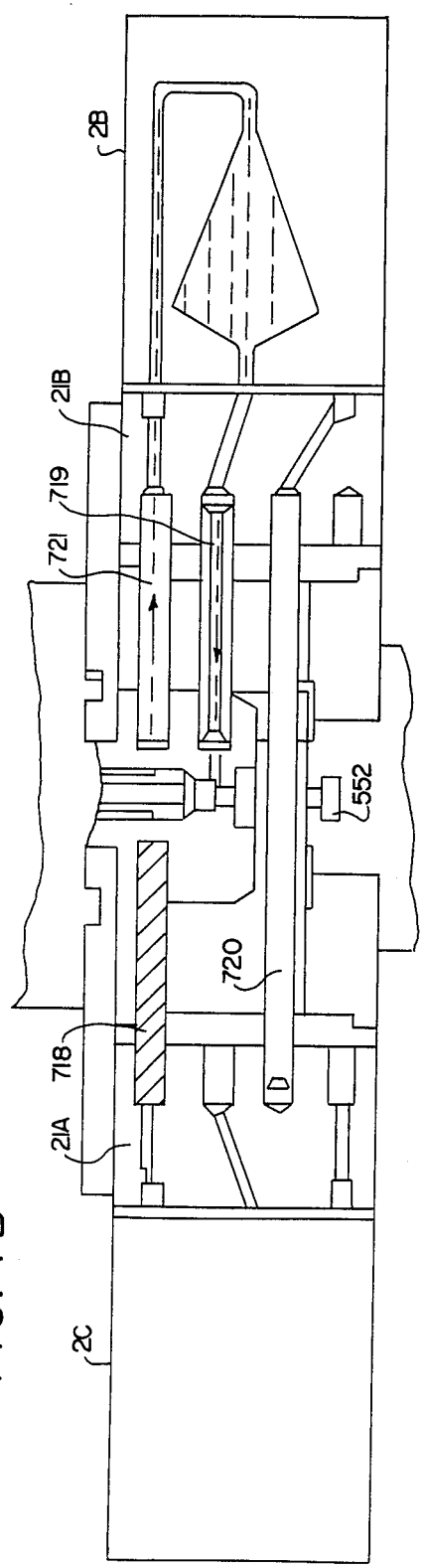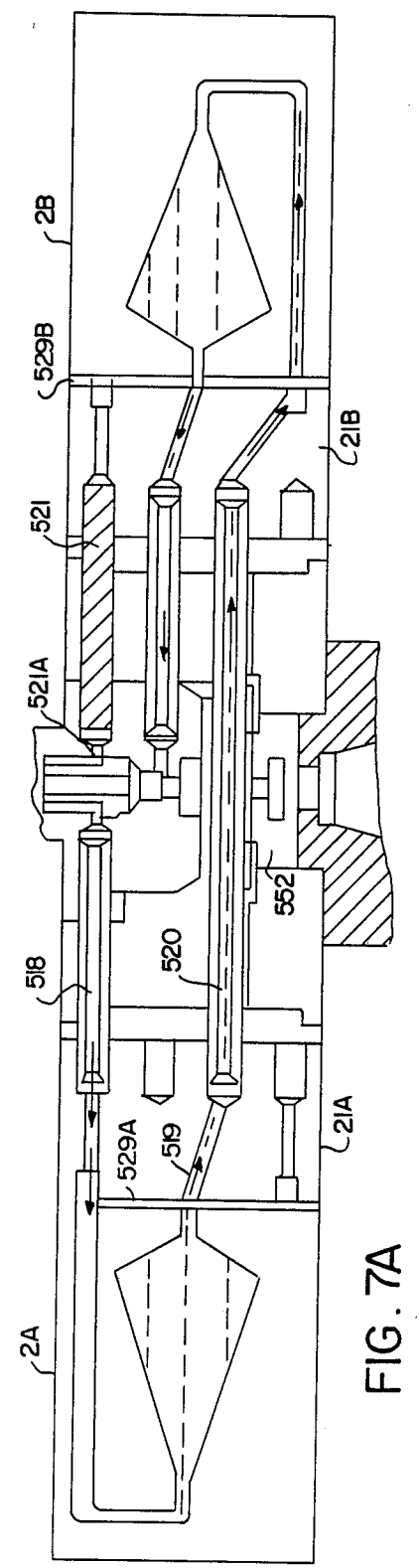
FIG. 7B
FIG. 7A

ROTOR FOR CENTRIFUGE

FIELD OF THE INVENTION

The present invention relates to the field of centrifuges and more particularly to a centrifuge rotor for separating particles by the process known as centrifugal elutriation.

BACKGROUND AND PRIOR ART

Centrifugal elutriation involves the separation of cells or other particles by subjecting them to two opposing forces within a separation chamber. The two forces that the particles are subjected to are: (a) the centrifugal field generated by a spinning rotor and (b) a viscous drag of a fluid flowing in the opposite (centripetal) direction.

The two forces are counterbalanced in order to separate the particles. Each particle tends to migrate to a zone where its sedimentation rate is balanced by the flow rate of the fluid through the separation chamber. Because the chamber's geometry produces a gradient of flow rates from one end of the chamber to the other end, cells within a wide range of different sedimentation rates can be held in suspension. By increasing the flow rate of the elutriation fluid in steps, or decreasing the rotor speed, successive populations of relatively homogeneous cell sizes can be washed from the chamber. Each population will contain cells or particles which are larger or more dense (i.e., faster sedimentating) than those of the previous fraction. The principles of centrifugal elutriation are well known and can, for example, be found discussed in a publication entitled "Centrifugal Elutriation of Living Cells an Annotated Bibliography", publication TS-534-C, published by the Beckman Instruments, Inc., Spinco Division, P.O. Box 10200, Palo Alto, Calif. 94304. The above reference publication is herein incorporate by reference.

There is a great deal of prior art describing various types of rotors for use in centrifuges. For example, U.S. Pat. No. 4,670,002 (Koreeda) and U.S. Pat. No. 4,350,283 (Leonian) describe rotors for centrifuges. The rotors shown in these patents include one or more elutriation chambers and a rotating seal for passing fluid to and from the motors. The elutriation chambers form an integral part of the rotor thus the rotor assembly is quite heavy. With rotors of the type shown in these patents, when a separation run is completed and one wants to sterilize the chamber, one must remove the entire rotor from the machine and place it in the autoclave sterilization unit.

Other centrifugal elutriation rotors are known wherein the collection chambers can be separated from the rotor and placed in an autoclave without placing the entire rotor in the autoclave. However, in such units the rotating seal is part of the basic rotor assembly and in order to clean the rotating seal one must place the entire rotor in the autoclave.

OBJECTS OF THE INVENTION

An object of the present invention is to provide an improved centrifugal elutriation rotor assembly.

A further object of the present invention is to provide a centrifugal elutriation rotor which can handle a relatively high quantity of particle containing fluid.

Yet another object of the present invention is to provide a centrifugal elutriation rotor which can easily be adapted for use with one or two separation chambers.

Another object of the present invention is to provide a high volume rotor which has relatively low aerodynamic resistance.

A still further object of the present invention is to provide a centrifugal elutriation rotor wherein the collection chambers and the rotating seals can be removed from the unit without removing the base rotor assembly.

A still further object of the present invention is to provide a rotor assembly which can easily be adapted to accommodate one or a plurality of separation chambers.

SUMMARY OF THE INVENTION

The present invention provides an improved rotor for a centrifuge that operates by centrifugal elutriation. The rotor consists of a chamber assembly, a disk assembly, and a quick release mechanism. The chamber assembly is relatively light and it includes one or two separation chambers, tubing and a rotating seal. The disk assembly consists of the relatively heavy support structure. The two piece construction facilitates handling the parts of the rotor that generally need to be autoclaved. The chamber assembly has a novel structure that allows the rotor to easily be configured for operation with one or two chambers. The disk assembly has a unique strain relief that prevents structural cracking. The quick release mechanism is held in the latched position by centrifugal force during operation of the rotor.

DESCRIPTION OF THE DRAWINGS

FIG. 1 is a perspective view of the assembled rotor.

FIG. 2 is an exploded view showing how the chamber assembly can be separated from the disk assembly.

FIG. 5 is a general cross section view of the entire assembly.

FIGS. 7A and 7B show the paths of fluid flow.

DETAILED DESCRIPTION OF A PREFERRED EMBODIMENT

Figure 3:
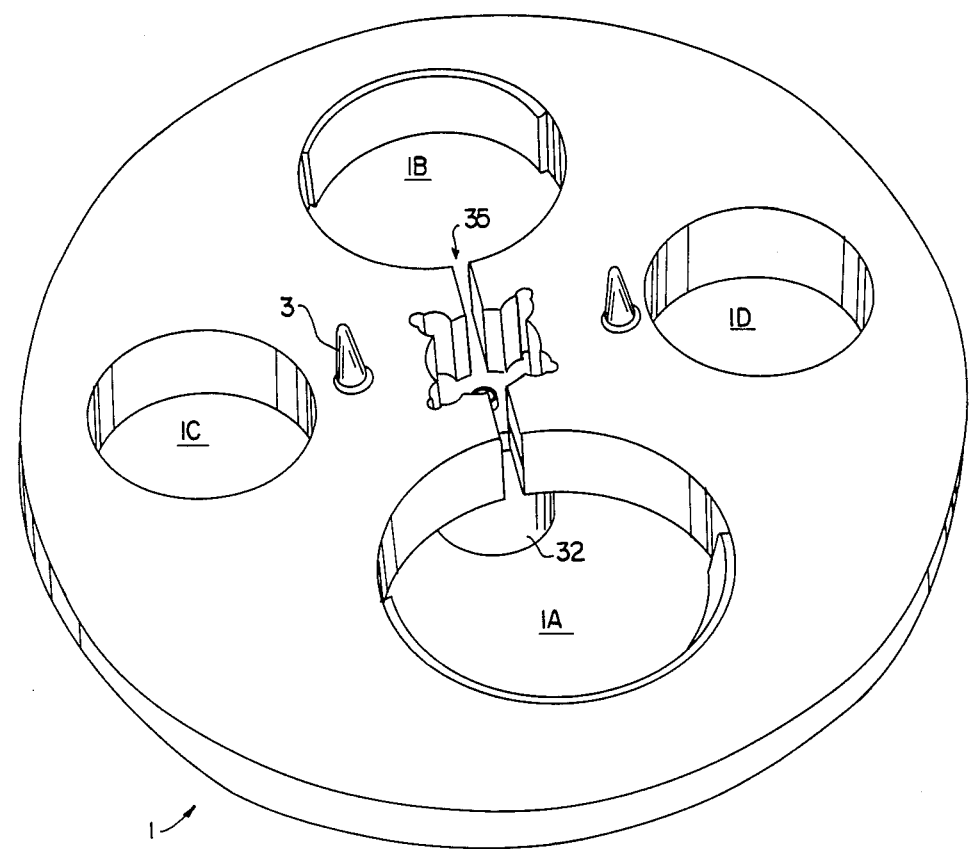
FIG. 3 is a perspective view of the rotor assembly.

An overall view of the rotor is shown in FIG. 1. The unit consists of a disk 1, a separation assembly 2, a quick release mechanism 3 and a rotating seal 4. FIG. 2 shows the separation assembly 2 detached from the disk 1.

The separation assembly 2 has two separation chambers 2A and 2B interconnected by rigid tubes 520. One of the chambers 2A or 2B can be a dummy chamber or counterweight as will be described later. Tubes 520 connect with a conventional rotating seal 4 to openings 11 and 12. The tubes 520 and their interconnections will be described in detail later. The separation chambers 2A and 2B are attached to a hub 14 by bolts 13A, 13B, 13C and 13D.

The disk 1 which is shown in detail in FIG. 3 has two openings 1A and 1B which are adapted to receive the separation chamber 2A and 2B and two openings 1C and 1D that merely serve to reduce the weight of the disk. A conventional hub 32 connects the rotor to the spindle of the centrifuge (not shown). The rotor described herein can for example be used with a standard J-6 floor model refrigerated centrifuge, which is commercially available from Beckman Instruments Corporation, Spinco Division, Palo Alto, Calif.

One of the key advantage of the present invention is that the chamber assembly 2 is removable from the disk 1. Assembly 2 is much lighter than disk 1 since disk 1 is the structural part that must withstand the centrifugal forces generated when the centrifuge is operating. The separation chamber assembly 2 can be moved to an autoclave for sterilization much more easily than could both the chamber assembly 2 and the disk 1.

The disk 1 is designed to withstand the centrifugal force to which the rotor is subjected. It is constructed from aluminum plate as is conventional. In the specific embodiment shown herein, the rotor diameter is 16 and ½ inches, the thickness is 2 inches and it weights 33 pounds. The thickness between the outside edge of holes 1A to 1D and the periphery of the rotor is 1 and ¼ inches. The holes 1A and 1B have a diameter of 5 inches and holes 1C and 1D have a diameter of 4 inches. Naturally it should be understood that these are merely the dimensions of one particular embodiment of the invention and that other dimensions could be used without departing from the spirit or scope of the invention.

A pressure pad 19A is positioned between separation chamber 2A and disk 1 and a pressure pad 19B is positioned between separation chamber 2B and disk 1. These pads hold the separation chamber 2A and 2B from moving outward. The pressure pads 19A and 19B are made of a flexible material such as plastic or rubber. High density polyphylene (HDPE) can, for example, be used. Since pads 19A and 19B are considerably more flexible than either the aluminum disk 1 or the plastic chambers 2A and 2B, the pads compensate for any dimensional irregularities between the chambers 2A and 2B and the walls of the holes in disk 1.

Figure 4:
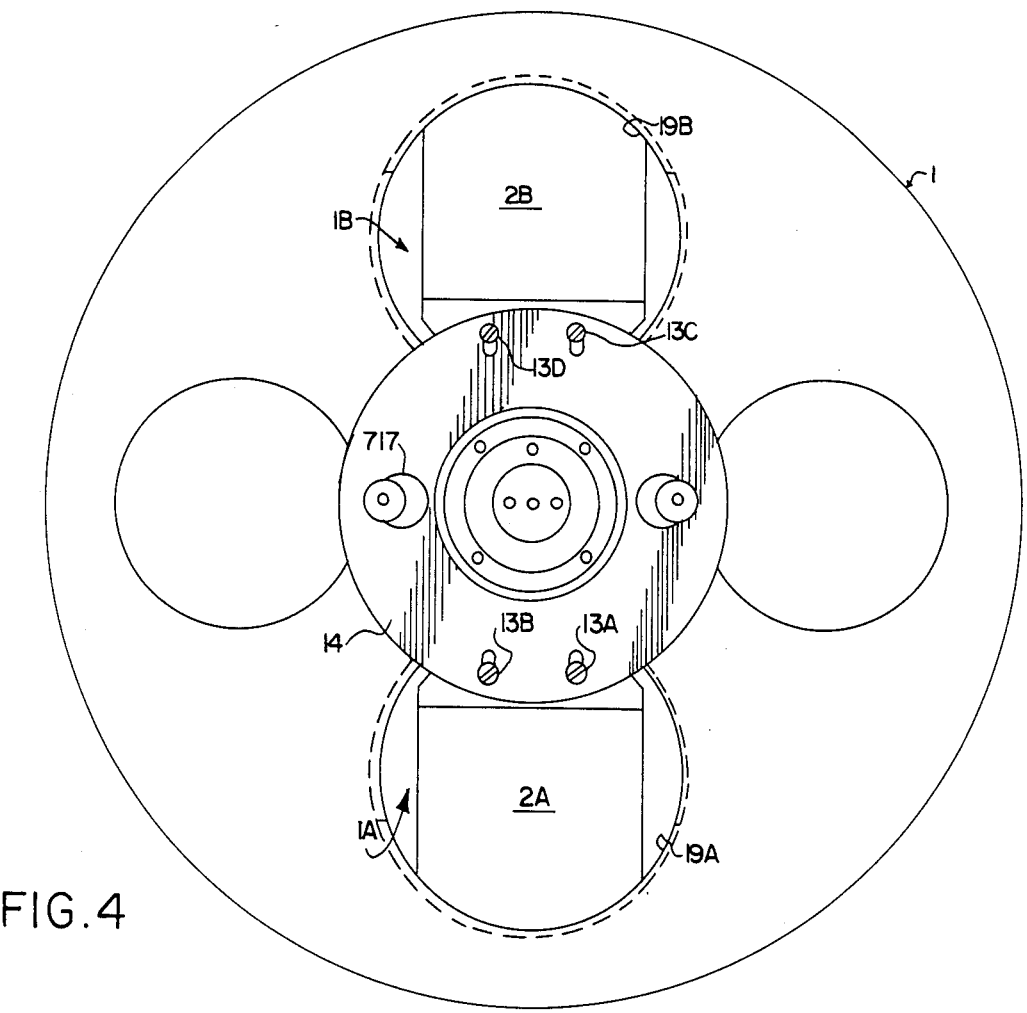
FIG. 4 is a top view of the total assembly.

As shown in FIG. 4, bolts 13A to 13D fit in slots in hub 14 so they do not hold the separation units 2A and 2B from moving in or out. Thus, all the centrifugal force is transmitted between disk 1 and operation units 2A and 2B via pads 19A and 19B.

Rotor disk 1 is attached to the hub 32 by means of bolts 501 and a spring washer 502 (see FIG. 5). The interface surface 503 of the hub 32 is coated with a conventional low friction non-galling material. The bolts 501 are suitably torqued to allow the split hub of the rotor disk 1 to be flexed radially normal to the split 35 when stressed by high rotation speeds. It can move relative to the surface of the hub 32 at the interface 503. A typical torque value for the bolts is 60 inch pounds. An example of a low friction interface material 503 which can be used is a plastic sheet or Microseal 100-1 which is graphite based and which is commercially available.

Figure 8:
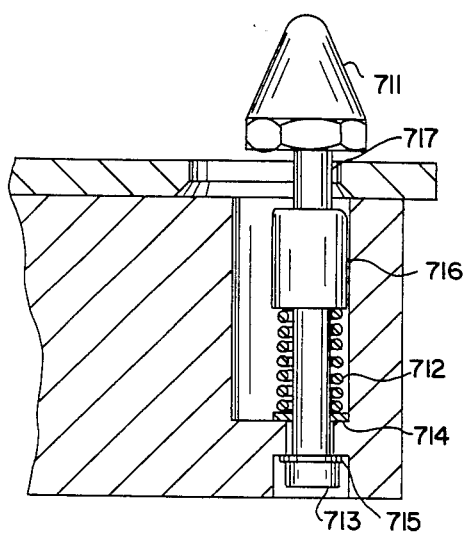
FIG. 8 is a cross sectional view of one of the quick release mechanisms.

Quick lock-quick release latching mechanism 3 is shown in detail in FIG. 8. It includes a spring 712 which holds the latch in the locked position. Centrifugal force also helps to hold it in the locked position when the assembly is being rotated. The latching mechanism 3 is finger operated by pushing on the head 711. Head 711 is tapered for ease of installation of the chamber assembly 2.

Two washers 714 and 715 prevent undue wear within the rotor body 1 when the device is operated. Bolt 713 is treaded into shaft 716. The geometry of the mating surfaces and the direction of the spring force cause the latch 713 to be returned to a position normal to the surface of the rotor whenever displaced from the vertical in order to release assembly 2 from disk 1. Outward radial motion is limited by enlarged portion of shaft 716. The location of the hole 717 in the surface of plate 14 is such that head 717 can only move through the hole when the spring 712 is under tension. This prevents accidental unlatching during the run.

It should be noted that the latching mechanism 3 merely serves to hold separation chamber assembly 2 in disk 1.

Latching mechanism 3 does not convey any tangential or radial forces to the unit 2. The force to move rotate unit 2 comes from the walls of holes 1A and 1B.

FIG. 5 shows the details of how the separation chambers 2A and 2B are attached to the hub 32. Separation chamber bodies 527 and 528 are attached to headers 21A and 21B through a rubber or plastic gaskets 529A and 529B. Headers 21A and 21B have holes which allow fluid to pass from tubes 518, 519, etc to the chambers 2A and 2B. As will be explained with reference to FIGS. 7A and 7B, the orientation of headers 21A and 21B relative to separation chambers 2A and 2B can be changed in order to change from a one chamber to a two chamber operation.

Separation chamber assemblies 2A and 2B can have any one of a multitude of cavity sizes and shapes, or a combination thereof, as suitable to the specific application. For example, they can have the type of cavities shown in U.S. Pat. No. 4,350,283 (Leonian). In the particular embodiment shown here the separation chambers are the same shape of the chambers in U.S. Pat. No. 4,350,283 (Leonian) but they are larger in size. The exact shape and size of the chambers is not relevant to this invention except that the invention allows larger chambers to be used without creating significant air drag since the chambers fit into the holes in disk 1.

The separation chambers 2A and 2B can be manufactured of a multitude of materials such as plastic or metal. They can be made by various techniques such as casting, injecting molding or machining. The embodiment shown herein uses a maximum of two chambers; however, the embodiment could easily be modified to use more than two chambers.

The interconnecting tubing 518, 519 and 520 can be metal, plastic, rigid or semi-rigid, so long as it is capable of withstanding the maximum centrifugal field, fluid pressure and chemical characteristics of the fluid being used. As shown in FIGS. 7A and 7B, some of the tubing elements are solid. The solid tubes merely serve to block some of the holes.

Figure 6:
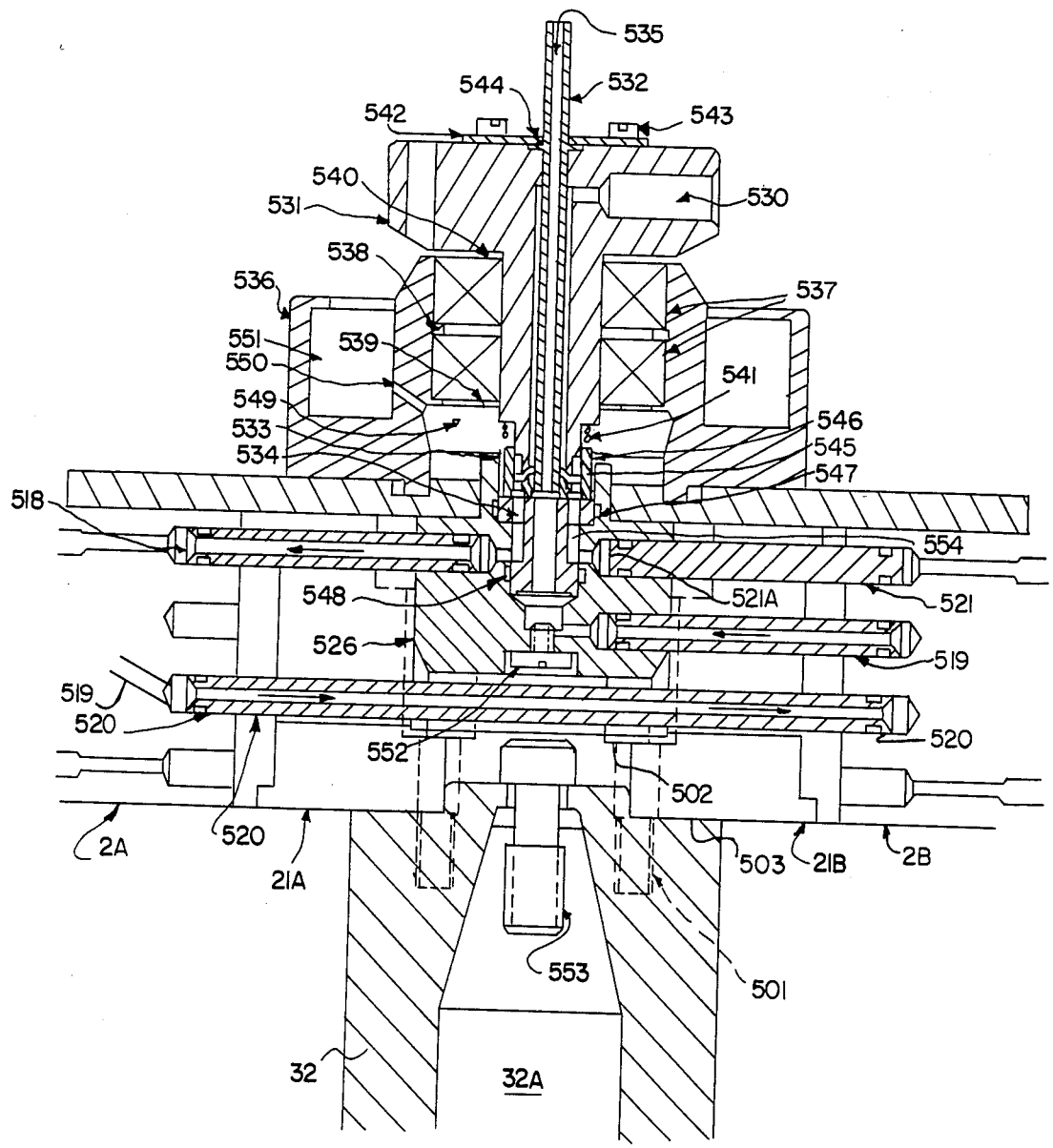
FIG. 6 is an enlarged cross section showing the fluid flow paths.

The separation chamber assemblies 2A and 2B can be run in series by selecting the configuration shown in FIGS. 5, 6 and 7A or only one separation chamber can be used by selecting the alternative configuration shown in FIG. 7B. With the chambers connected in series as shown in FIGS. 5, 6, and 7A, fluid enters the back end of chamber 2A via tube 518. After being separated in chamber 2A it passes through tube 520 to the back end of chamber 2B. It exits chamber 2B via tube 519. Tube 521 is solid and it merely serves to block the port 521A.

In order to operate with only one chamber, the chamber 2A is replaced by a counterweight of the same size and weight as a full chamber and the tubes are rearranged as shown in FIG. 7B. In the embodiment shown in FIG. 7B, fluid enters chamber 2B via tube 721 and leaves via tube 719. Tubes 718 and 720 are solid in order to block the ports to which they are connected.

The material for the gaskets 529A and 529B as well as its specific physical design are conventional. The material for the gasket should be selected such as to allow reliable complete tight operation without crushing or deleterious permanent deformation. Material should be selected such that the gaskets can be used time after time and repeatedly cycled as well as repeatedly autoclaved without the need to loosen and otherwise disturb the interface of the separation chambers 2A and 2B.

The fluid path from input port 530 to discharge port 535 is shown in FIG. 6. The seal bearing assembly 554 has a fluid entrance port 530 on the stationary bearing support 531. The fluid travels down through the annulus formed by the center cavity in element 531 and the outer wall of discharge tube 532, through the static half 533 of the seal and thence through the dynamic half 534 of the seal, the seal housing 526, the tube 518 and into the chamber 2A. From there the fluid continues through tube 520 into chamber 2B then back through tube 519, seal housing 526, center ports of the seal 534 and seal 533 and out through discharge tube 532 and port 535. A stationary support 531 is coupled to the dynamic support 536 through bearings 537 and retainers 538 and 539. A washer spring 540 provides the necessary bearing preload while coil spring 541 provides the necessary sealing force for the dynamic surface seal. The discharge tube 532 is clamped in with plate 542, screws 543 and retainer ring 544. Seal housing 526 and bearing housing 536 are clamped to support plate 554 with a multitude of screws (not shown).

"O" rings 544, 545, 546, 547 and 548 provide sealing as appropriate. It should be noted that contrary to the prior art, the discharge tube 532 is readily removable for cleaning purposes and the bearings 537 are situated above the seal assembly, thus removed from potential contamination by biological fluids that may impair their operation. Furthermore, any potential leaks from the interface of the seal assembly 533 and 534 is centrifuged to annular groove 549 and out through a multitude of radial passageways 550 into cavity 551 where its accumulated for removal at the conclusion of the run.

The leak collection system 549, 550 and 551 allows the operator to easily detect any leaks. The operator can check for leaks prior to a run and during a run. This leak detection system also allows the operator of the system to monitor and detect leaks in the rotating seal. Should leakage be in excess of the capacity of cavity 551, it can be emptied continuously during the run through the use of an aspirator (not shown).

Seal screw at port 552 is provided for inspection as well as forceful removal of seal 534 through the use of a long screw used as a drag screw (not shown). As shown in FIG. 6, hub 32 is attached to the instrument spindle 32A with a bolt 553 through hub 32. The attachment of the hub 32 to spindle 32A is conventional. Routine operation does not require its removal. Should sterile conditions be required, the disk unit 1 is readily removable and autoclavable as an intact assembly.

The technique of attaching the disk assembly 1 to hub 32 is novel and is covered in copending application Ser. No. 07/115,480, filed 10/30/87 entitled Rotor with Stress Relief which was filed on the same day as this application.

The disk 1 has an opening 35 which separates the disk into two halves and prevents stress cracks from forming in the hub area. The entire centrifugal force is borne by the edge of the disk 1. This provides a very reliable and long lasting disk. The purpose and function of opening 35 is more fully described in copending application Ser. No. 07/115,480 filed 10/30/87 entitled Rotor with Stress Relief which was filed on the same day as was this application.

It is noted that the fact that the separation chambers are in the openings in disk 1, provides a rotor which has very low aerodynamic resistance, thereby allowing the device to be operated at relatively high speed with relatively low power.

While a particular embodiment of the invention has been shown and claimed, it should be clearly understood that the invention is not limited to the specific embodiment shown herein. Many modifications may be made without departing from the spirit and scope of the invention. The description of a specific embodiment is not meant to limit the scope of the invention. It is contemplated and specifically stated that the applicant s invention covers all such modifications and alternatives to the specific embodiment shown which may fall within the words and spirit of the appended claims. It is to be fully understood that all of the foregoing is intended to be merely illustrative and is not to be construed or interpreted as being restrictive or otherwise limiting of the present invention.

I claim:

1. An improved rotor for a centrifuge that operates by centrifugal elutriation comprising,
    a unitary chamber assembly having at least one separation chamber, a rotating fluid seal, and tubes for passing fluid from and to said chamber through said rotating seal,
    a generally flat disk assembly with at least one recess, said recess having walls, said separation chamber positioned in said recess, whereby said walls physically hold said chamber assembly, and
    a quick release mechanism connecting said chamber assembly and said disk assembly.

2. The rotor recited in claim 1 wherein said disk assembly comprises a disk with a plurality of openings and means for connecting said disk to a centrifuge spindle.

3. The rotor recited in claim 1 wherein said chamber assembly has two separation chambers connected in series.

4. An improved rotor for a centrifuge that operates by centrifugal elutriation comprising,
    a disk having a plurality of openings,
    means for connecting said disk to a centrifuge spindle,
    a unitary separation chamber assembly comprising,
        at least one separation chamber adapted to be positioned in one of the openings in said disk, whereby said chamber does not add to the aerodynamic resistance of said disk,
        an entrance port, an exit port, and a rotating seal for fluid and, means connecting said separation chamber to said entrance and exit ports through said rotating seal,
    whereby said separation chamber assembly can be removed from said disk.

5. An improved rotor for a centrifuge comprising in combination,
    connection means for supplying fluid to and for removing fluid from said rotor,
    a disk having first and second openings,
    a first unitary separation chamber assembly means positioned in said first opening,
    a rotating seal, tubing means connecting said first separation chamber means through said rotating seal to said connection means, means removably securing said first separation chamber means and said tubing means to said disk, whereby said chamber means and said tubing means can be removed for cleaning without removing said disk means.

6. The combination recited in claim 5 including a second separation chamber means positioned in said second opening in said disk, said tubing means including means connecting said first and said second separation chamber means in series.

7. The combination recited in claim 5 including a counterweight positioned in said second opening.

8. The combination recited in claim 5 including a hub wherein said rotating seal is mounted, a plurality of fluid passageways in said hub for allowing fluid to move vertically through said hub, and a plurality of rigid tubes connecting said separation chamber to said fluid passageways.

9. The combination recited in claim 5 including a second separation chamber means positioned in said second opening in said disk, a hub wherein said rotating seal is mounted, a plurality of fluid passageways in said hub for allowing fluid to move vertically through said hub, and said tubing means including a plurality of rigid tubes connecting said separation chambers in series and connecting said separation chambers to said fluid passageways.

10. A rotor for a centrifuge comprising in combination, a disk having means for connecting said disk to a drive shaft, said disk having a plurality of openings each of which has walls, a unitary separation chamber assembly having at least one separation chamber and fluid connecting means for connecting said chamber to external tubes via a rotating seal, said separation chamber being adapted to fit in one of said openings in said disk, and holding means for removably holding said separation chamber assembly to said disk, said holding means providing to tangential force to said separation chamber assembly, whereby radial and tangential forces are exerted on said chambers by said walls, a leak detection system comprising a leak collection chamber, a holding chamber and a passageway connecting said leak collection chamber and said holding chamber, said chambers being positioned such that fluid an be moved from said collection chamber to said holding chamber by centrifugal force.

* * * * *